United States Patent Office 3,813,323
Patented May 28, 1974

3,813,323
ELECTRODEPOSITION COATING METHOD
Masahiro Ogawa, Toyota, Japan, assignor to Toyota Jidosha Kogyo Kabushiki Kaisha, Toyota-shi, Japan
Filed Feb. 8, 1972, Ser. No. 224,440
Claims priority, application Japan, Apr. 20, 1971, 46/25,399
Int. Cl. B01k 5/02
U.S. Cl. 204—181
9 Claims

ABSTRACT OF THE DISCLOSURE

The present invention relates to electrophoretic electrodeposition of polyamide resin powder. More specifically, a method of electrodeposition is provided wherein the dispersion medium is a mixed solution of methylethylketone and trichloroethylene, or such a solution added with carbon tetrachloride. Through electrophoretic electrodeposition, polyamide resin powder dispersed within the medium is uniformly deposited onto the surface of an object to be coated to thereby form a coating of polyamide resin on the object.

BACKGROUND OF THE INVENTION

The present invention relates to a method of electrodeposition of polyamide resin on an object to be coated.

For the purpose of coating an object with solid resin, a method is available comprising dispersing resin powder in an organic dispersion medium, electrophoretically electrodepositing the resin on an object, and then baking it thereon. This method is in addition to the conventional powder coating method and electrostatic coating method for nylon coatings. This method has a number of advantages such as no deterioration by heat, good adhesion to the coated object, uniformity of coated thickness, little loss of resin powder, fast rate of electrodeposition, and no generation of gases or rust when using water as the dispersion medium.

This method, however, has not been applicable to nylon because of the lack of any organic dispersion medium which assures stable electrophoresis. Nylon, a polyamide resin with excellent resistance to wear and corrosion, has a larger specific gravity than any other resin and is of such a nature that it cannot be submitted to electrophoresis with stability.

SUMMARY OF THE INVENTION

It has been discovered that a mixed solution of mainly methylethylketone and trichloroethylene in adequate proportions and, if necessary, added with carbon tetrachloride, makes a good dispersing agent that uniformly disperses polyamide resin and assures efficient electrodeposition thereof.

The present invention is an electrodeposition coating method characterized by forming a coating mainly composed of polyamide resin on the surface of an object in an electrodeposition bath. Polyamide resin powder alone or polyamide resin powder and a solid wetting agent powder are dispersed in a dispersion medium solution of methylethylketone and trichloroethylene. Carbon tetrachloride may be also added to the solution instead of trichloroethylene.

BRIEF DESCRIPTION OF THE DRAWING

Novel features and advantages of the present invention in addition to those mentioned above will become apparent to those skilled in the art from a reading of the following detailed description in conjunction with the accompanying drawing wherein.

DETAILED DESCRIPTION OF THE INVENTION

Figure 1:
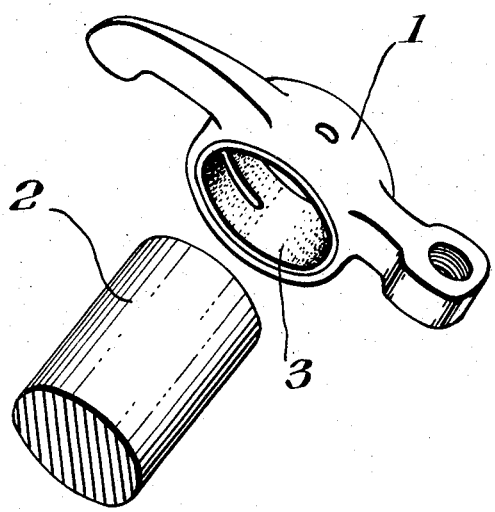
FIGS. 1 and 2 are oblique views of an object applied with a resin coating according to the present invention wherein the stippled area 3 represents the portion electrodeposited, coated with nylon 12 and baked.
Figure 2:
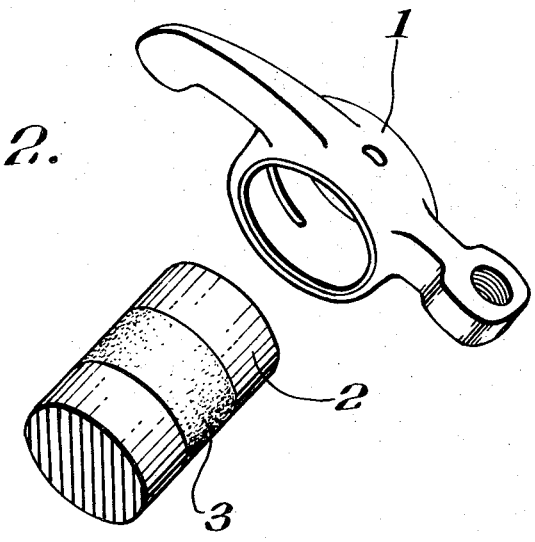

The present invention relates to a method for electrophoretic electrodeposition of polyamide resin powder. The dispersion medium to be employed in this invention is a mixture in approximately 2:1 proportions of methylethylketone (hereinafter abbreviated as MEK) and trichloroethylene (hereinafter abbreviated as trichlene), added with a small quantity of carbon tetrachloride, depending upon the dispersed state of the resin powder. Specifically, the above mentioned proportions of the mixture differ depending upon the kind of polyamide resin and the particle size of the powder. Also, as illustrated in each example, the proportions are such that polyamide resin powder is dispersed with perfect uniformity in the depth direction of the mixed solution. Concerning a solid wetting agent that can be dispersed in the dispersion medium used in this invention, the agent can be dispersed together with polyamide powder in a solution and electrodeposited together with polyamide powder, as illustrated in Examples 2 and 5.

The following are Examples of the present invention.

Example 1

First, 25 g. of the fine powder of nylon 12 of under 120 screen mesh size is poured and stirred into 1000 cc. (20° C.) of a mixed solution of two parts MEK and to one part trichlene as the dispersion medium. In the event the nylon powder floats, slightly more MEK is added. On the other hand, if the powder sinks, some trichlene is added to adjust and stabilize the specific gravity of the mixed solution so that nylon powder is well dispersed in the solution.

Next, a steel plate (120 x 120 x 0.8 mm.) to be coated with nylon is immersed in the dispersed solution thus obtained. Then with the plate as the anode and the vessel (tank) holding the solution as the cathode, an electric potential gradient of 500 v./cm. is passed through the solution. As a result of electrophoresis, nylon powder is electrodeposited on the surface of the steel plate to be coated. About 5 seconds of current flow deposits nylon at a rate of about 10 mg./cm.$^2$. After the deposition of nylon is baked by high-frequency induction heating, a nylon coating of uniform thickness 0.19±.015 mm. is formed.

Example 2

Molybdenum disulphide (800 mesh) is added at a rate of 5 weight percent of nylon powder to the nylon powder-dispersed solution of Example 1. After being stirred, the solution is readjusted by adding a small amount of trichlene. By executing the electrodeposition using the above dispersed solution and baking the coated product in the same manner as Example 1, a nylon composite deposit coat is obtained. In this case, the nylon coating containing molybdenum disulphide is about 0.2 mm. in thickness.

Example 3

First, 25 g. of polyamide resin (nylon 12) powder of under 150 screen mesh size is poured into 1000 cc. (20° C.) of a mixed solution of seven parts MEK, two parts trichlene and one part carbon tetrachloride. During stirring, the solution is adjusted with small addition of each solvent so that the polyamide resin powder is well dispersed. For instance, if the resin floats, a small amount of MEK is added, and if it sinks, trichlene or carbon tetrachloride is added in small amounts.

The dispersed solution thus adjusted is employed as the electrodeposition bath. With the tank holding the solution as the cathode and a steel plate (120 x 120 x 0.8 mm.) to be coated as the anode, an electric potential gradient of 500 v./cm. is established between the two electrodes. Then, polyamide resin is submitted to electrophoresis and after about 9 seconds of current flow a film is formed on the steel plate. The coated plate is then subjected to high-frequency induction heating for the purpose of baking the coating, and a polyamide resin coat of about 10 mg./cm.² is formed on the steel plate.

Example 4

Initially, 40 g. of fine powder of nylon 12 of under 120 screen mesh is poured and stirred into 1000 cc. (20° C.) of a mixed solution of two parts MEK and one part trichlene. If the nylon powder floats, a small amount of MEK is added, and if it sinks, a small quantity of trichlene is added in order to adjust and stabilize the specific gravity of the mixed solution so that the nylon powder is well dispersed.

A steel plate of the order employed in Example 1 is immersed in the dispersed solution thus prepared. Also, the electrodepositing procedure followed in Example 1 is carried out. As a result, a deposit coat of about 15 mg./cm.² is formed on the surface of the steel plate. After the deposit coat is baked following the conditions of Example 1, a nylon coating of uniform thickness 0.31±0.05 mm. is formed.

Example 5

In this example, 25 g. of fine powder (150 mesh) of nylon and molybdenum disulphide (800 mesh) are added and stirred into the mixed solution of Example 3 at a rate of 5 weight percent of nylon powder. Then, a steel plate of the type used in Example 3 is immersed in the solution thus prepared. After 15 seconds of current flow under the same electrodepositing condition as in Example 3, a nylon coating containing molybdenum disulphide is formed at a rate of about 11 mg./cm.² on the surface of the steel plate.

In Examples 1–5, the steel plate is completely degreased by conventional pretreatment and then washed with water. The above examples are experimental ones. The next example illustrates a practical application.

Example 6

In this example the object to be coated include a valve rocker arm 1 and a shaft 2, as shown in the drawing. The stippled portion 3 is electrodeposited, baked and thereby coated with nylon 12 in accordance with the method of Example 1. The arm 1 and shaft 2 thus coated were attached to an auto engine (water-cooled, four cylinders, OHV exhaust, 1490 cc., output 70 PS), and the engine submitted to a running test. In the test no stripping of the coating occurred, and the coating was not inferior to that of the conventional copper or lead bearings.

The nylon coated bearing according to the present invention is far less expensive than copper or lead bearings. In addition to the advantages with respect to cost and production, the nylon coating has the additional advantage of being free from wear abrasion before the oil circulates at the time of engine start-up. This is a direct result of the self-lubricating properties of the resin. By preventing abrasion or stepped wear of the valve rocker arm and shaft, the engine is capable of long-trouble-free service.

What is claimed is:

1. An electrodeposition coating method comprising the steps of preparing a dispersion medium solution of methylethylketone and trichloroethylene, adjusting the ratio of methylethylketone and trichloroethylene to obtain a specific gravity of the solution compatible with polyamide resin powder to be dispersed therein, dispersing polyamide resin powder in the medium without using a surface active agent and taking the thus formed solution as an electrodeposition bath, taking an object to be coated and positioning it as an electrode in the bath with the vessel containing the bath as the other electrode, and passing a rectifying current between the electrodes to thereby form a coating of polyamide resin on the surface of the object.

2. An electrodeposition coating method as in claim 1 in which carbon tetrachloride is added to the solution of methylethylketone and trichloroethylene to prepare a dispersion medium for the polyamide resin powder.

3. An electrodeposition coating method as in claim 2 in which polyamide resin powder and a solid wetting agent powder are both dispersed in the dispersion medium to prepare the electrodeposition bath.

4. An electrodeposition coating method as in claim 3 in which nylon is used as the polyamide resin powder and molybdenum disulphide is used as the solid wetting agent powder.

5. An electrodeposition coating method as in claim 1 in which polyamide resin powder and a solid wetting agent powder are both dispersed in the dispersion medium to prepare the electrodeposition bath.

6. An electrodeposition coating method as in claim 5 in which nylon is used as the polyamide resin powder and molybdenum disulphide is used as the solid wetting agent powder.

7. An electrodeposition coating method as in claim 1 in which the dispersion medium is a mixture of methylethylketone and trichloroethylene in the proportion of about 2:1.

8. An electrodeposition coating method as in claim 1 in which the polyamide resin powder is nylon.

9. An electrodeposition coating method as in claim 1 in which a valve rocker arm and its shaft are the object to be coated.

References Cited

UNITED STATES PATENTS

| 2,994,654 | 8/1961 | Fahnoe et al. | 204—181 |
| 3,657,092 | 4/1972 | Fisher et al. | 204—181 |
| 3,672,970 | 6/1972 | Tomaszewski | 204—181 |

HOWARD S. WILLIAMS, Primary Examiner

U.S. Cl. X.R.

117—17, 93